(12) United States Patent
Kreis et al.

(10) Patent No.: US 10,994,794 B2
(45) Date of Patent: May 4, 2021

(54) POWER DISTRIBUTION THROUGH UNDERCARRIAGE IDLER WHEELS

(71) Applicant: DEERE & COMPANY, Moline, IL (US)

(72) Inventors: Edwin R. Kreis, Waterloo, IA (US); Dennis A. Bowman, Denver, IA (US); Charles N. Warren, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 312 days.

(21) Appl. No.: 16/140,831

(22) Filed: Sep. 25, 2018

(65) Prior Publication Data

US 2020/0094894 A1     Mar. 26, 2020

(51) Int. Cl.
| | |
|---|---|
| *B62D 55/125* | (2006.01) |
| *B62D 55/14* | (2006.01) |
| *B60K 6/20* | (2007.10) |
| *B60K 6/50* | (2007.10) |
| *B60K 17/02* | (2006.01) |
| *B60K 17/08* | (2006.01) |
| *B60K 6/46* | (2007.10) |
| *F16H 7/06* | (2006.01) |

(Continued)

(52) U.S. Cl.
CPC ............. *B62D 55/125* (2013.01); *B60K 6/20* (2013.01); *B60K 6/46* (2013.01); *B60K 17/02* (2013.01); *B60K 17/08* (2013.01); *B62D 55/104* (2013.01); *B62D 55/14* (2013.01); *F16H 3/66* (2013.01); *F16H 7/06* (2013.01); *F16H 37/02* (2013.01); *B62D 49/06* (2013.01)

(58) Field of Classification Search
CPC .... B62D 55/14; B62D 55/104; B62D 55/125; B62D 55/305; B60K 6/20; B60K 6/42; B60K 6/50
USPC .................................... 180/9.62, 9.64, 65.31
See application file for complete search history.

(56) References Cited

U.S. PATENT DOCUMENTS 1,391,529 A * 9/1921 Crochat .................... H02P 9/00
                                                              180/6.5
2,138,485 A * 11/1938 Faries ....................... B62B 3/06
                                                              414/434

(Continued)

FOREIGN PATENT DOCUMENTS

| DE | 1680005 A1 | 9/1971 |
| DE | 102011111822 A1 | 2/2013 |
| EP | 0413852 A1 | 2/1991 |

OTHER PUBLICATIONS

German Search Report issued in counterpart application No. 102019214247.8 dated Oct. 13, 2020 (12 pages).

*Primary Examiner* — Anne Marie M Boehler
(74) *Attorney, Agent, or Firm* — Taft Stettinius & Hollister LLP; Stephen F. Rost

(57) ABSTRACT

An undercarriage assembly for a tracked vehicle with a prime mover that provides a torque to the tracked vehicle, a final drive sprocket configured to provide a final drive torque on a track, a transmission mechanically coupled to the prime mover and the final drive sprocket to selectively transfer at least some of the torque generated by the prime mover to the final drive sprocket, at least one idler wheel that contacts the track, and an electric motor that provides an idler torque to the at least one idler wheel. Wherein, torque is distributed to the track through both the final drive sprocket and the idler wheel.

20 Claims, 10 Drawing Sheets

(51) Int. Cl.
*F16H 3/66* (2006.01)
*F16H 37/02* (2006.01)
*B62D 55/104* (2006.01)
*B62D 49/06* (2006.01)

(56) References Cited

U.S. PATENT DOCUMENTS

| | | | | |
|---|---|---|---|---|
| 2,832,426 A * | 4/1958 | Seargeant | ............... | A63H 30/04 |
| | | | | 180/2.1 |
| 3,295,620 A * | 1/1967 | Messenger | ............. | B62D 55/04 |
| | | | | 180/6.7 |
| 3,951,093 A * | 4/1976 | Poche | ................... | B60F 3/0015 |
| | | | | 440/12.63 |
| 4,519,465 A | 5/1985 | Triplett | | |
| 4,739,852 A | 4/1988 | Stevens et al. | | |
| 4,942,934 A | 7/1990 | Moriarty | | |
| 4,986,377 A | 1/1991 | Moriarty | | |
| 5,363,937 A * | 11/1994 | James | .................... | B62D 11/04 |
| | | | | 180/192 |
| 6,655,482 B2 * | 12/2003 | Simmons | .............. | B62D 55/125 |
| | | | | 180/9.1 |
| 7,182,414 B2 | 2/2007 | Park et al. | | |
| 7,461,710 B2 * | 12/2008 | Egen | ................... | B60L 15/2036 |
| | | | | 180/9.1 |
| 7,950,481 B2 * | 5/2011 | Betz | ........................ | B60K 6/46 |
| | | | | 180/65.31 |
| 9,956,881 B2 * | 5/2018 | Anderson | ............... | B60T 11/10 |
| 10,807,459 B2 | 10/2020 | Kreis et al. | | |
| 2008/0023233 A1 * | 1/2008 | Westergaard | ........ | B62D 51/007 |
| | | | | 180/9.1 |
| 2011/0108332 A1 | 5/2011 | Gleasman | | |
| 2015/0166132 A1 * | 6/2015 | Hellholm | .............. | B60K 6/46 |
| | | | | 180/9.1 |
| 2016/0083028 A1 * | 3/2016 | Hellholm | ............. | B62D 55/084 |
| | | | | 180/9.42 |
| 2016/0159418 A1 * | 6/2016 | Zimmer | ................. | B62D 55/12 |
| | | | | 180/9.62 |
| 2018/0022407 A1 * | 1/2018 | Lussier | .................. | B62D 55/30 |
| | | | | 180/9.1 |
| 2019/0144055 A1 * | 5/2019 | Zuchoski | ............ | B62D 55/104 |
| | | | | 180/9.21 |

* cited by examiner

POWER DISTRIBUTION THROUGH UNDERCARRIAGE IDLER WHEELS

FIELD OF THE DISCLOSURE

The present disclosure relates to a tractor that utilizes a tracked ground engaging mechanism, and more specifically to an auxiliary power supply for the tracked ground engaging mechanism.

BACKGROUND

Many work machines utilize tracked assemblies for propelling the work machine along an underlying surface. Often, a prime mover such as a gas or diesel engine burns fuel to generate torque that is transferred to the tracked assemblies. The torque is frequently mechanically coupled to the tracked assemblies through a transmission that utilizes clutches, gears, and the like to provide an adequate amount of torque to the tracked assemblies to facilitate movement of the work machine.

Large or high-powered machines require prime movers capable of producing substantial torque in order to properly move the work machine along with any implements or work tools coupled thereto. Accordingly, the transmission must be able to transfer the torque generated by the prime mover to the tracked assemblies without being damaged. If a single work machine chassis is offered with different prime movers capable of generating different torque values, each prime mover is often coupled with a specific transmission to ensure the transmission can transfer the torque to the tracked assemblies without being damaged. Further, tracked work machines are often torque limited based on the capabilities of the transmission. In this situation, the work machine cannot utilize a prime mover that provides a greater torque than the transmission can transfer without being damaged.

Accordingly, there is a need for a tracked work machine that can utilize a prime mover that provides high torque to the tracked assemblies without damaging the transmission.

SUMMARY

One embodiment is an undercarriage assembly for a tracked vehicle with a prime mover that provides a torque to the tracked vehicle, a final drive sprocket configured to provide a final drive torque on a track, a transmission mechanically coupled to the prime mover and the final drive sprocket to selectively transfer at least some of the torque generated by the prime mover to the final drive sprocket, at least one idler wheel that contacts the track, and an electric motor that provides an idler torque to the at least one idler wheel. Wherein, torque is distributed to the track through both the final drive sprocket and the idler wheel.

In one example of this embodiment, the electric motor is coupled to a motor sprocket and the idler wheel is coupled to an idler sprocket. One aspect of this example includes a chain or belt rotationally coupling the motor sprocket to the idler sprocket. Another aspect of this example includes a geared reduction between the motor and the motor sprocket. In this aspect, the geared reduction has a first reduction planetary drive and a second reduction planetary drive.

Another example has a clutch coupled to the motor sprocket, wherein the clutch selectively releases the rotational coupling between a motor output and the motor sprocket. In one aspect of this example, the clutch is selectively disengaged by an electro-hydraulic system.

Another embodiment of this disclosure is a track assembly for a work machine that has an undercarriage frame coupled to the work machine, a final drive rotationally coupled to the work machine, a transmission mechanically coupled to the final drive and a prime mover, the transmission selectively providing torque to the final drive, a rocker arm pivotally coupled to the work machine about a pivot, the rocker arm pivoting about the pivot relative to the undercarriage frame, an idler wheel rotationally coupled to the rocker arm, and an electric drive system coupled to the idler wheel to selectively provide torque to the idler wheel. Wherein, torque is provided to a track of the track assembly through both the final drive and the idler wheel.

In one example of this embodiment, the electric drive system is coupled to the rocker arm and is pivotal about the pivot relative to the undercarriage frame. In one aspect of this example, the electric drive system includes a motor housing, the motor housing defining a suspension mount between the motor housing and the undercarriage frame assembly.

In another example of this embodiment, the electric drive system includes a motor that has a diameter that is greater than a thickness of the motor and that selectively drives the idler wheel by providing torque to an idler wheel shaft. In one aspect of this example, the idler wheel includes an inner idler wheel and an outer idler wheel spaced from the inner idler wheel, the motor being positioned at least partially between the inner idler wheel and the outer idler wheel.

In another example of this disclosure the electric drive system includes an electric motor coupled to a right angle drive assembly via shafts, wherein the right angle drive assembly provides torque to the idler wheel.

In yet another example of this embodiment, the electric drive system has an electric motor mounted to the rocker arm, a motor sprocket coupled to a motor output assembly, an idler sprocket coupled to the idler wheel, and a chain or belt rotationally coupling the motor sprocket to the idler sprocket. One aspect of this example has a geared reduction between the motor and the motor sprocket. In another aspect of this example the electric drive assembly includes a clutch coupled to the motor sprocket, wherein the clutch selectively releases the rotational coupling between the motor output assembly and the motor sprocket.

Yet another embodiment is a torque delivery system for a work machine that has a prime mover that generates torque, a plurality of track assemblies, a transmission mechanically coupling the prime mover to each of the plurality of track assemblies to provide torque thereto, a generator mechanically coupled to the prime mover to convert torque from the prime mover into electrical energy, and an electric drive system mounted on at least one of the plurality of track assemblies. Wherein, both the electric drive system and the transmission provide torque to at least one of the plurality of track assemblies.

In one example of this embodiment, the plurality of track assemblies include four separate track assemblies wherein at least two of the track assemblies have an electric drive system. In one aspect of this example, each of the four separate track assemblies have an electric drive system. In yet another aspect of this example, the electric drive system includes an electric motor mounted to the rocker arm, a motor sprocket coupled to a motor output assembly, an idler sprocket coupled to the idler wheel, and a chain or belt rotationally coupling the motor sprocket to the idler sprocket.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
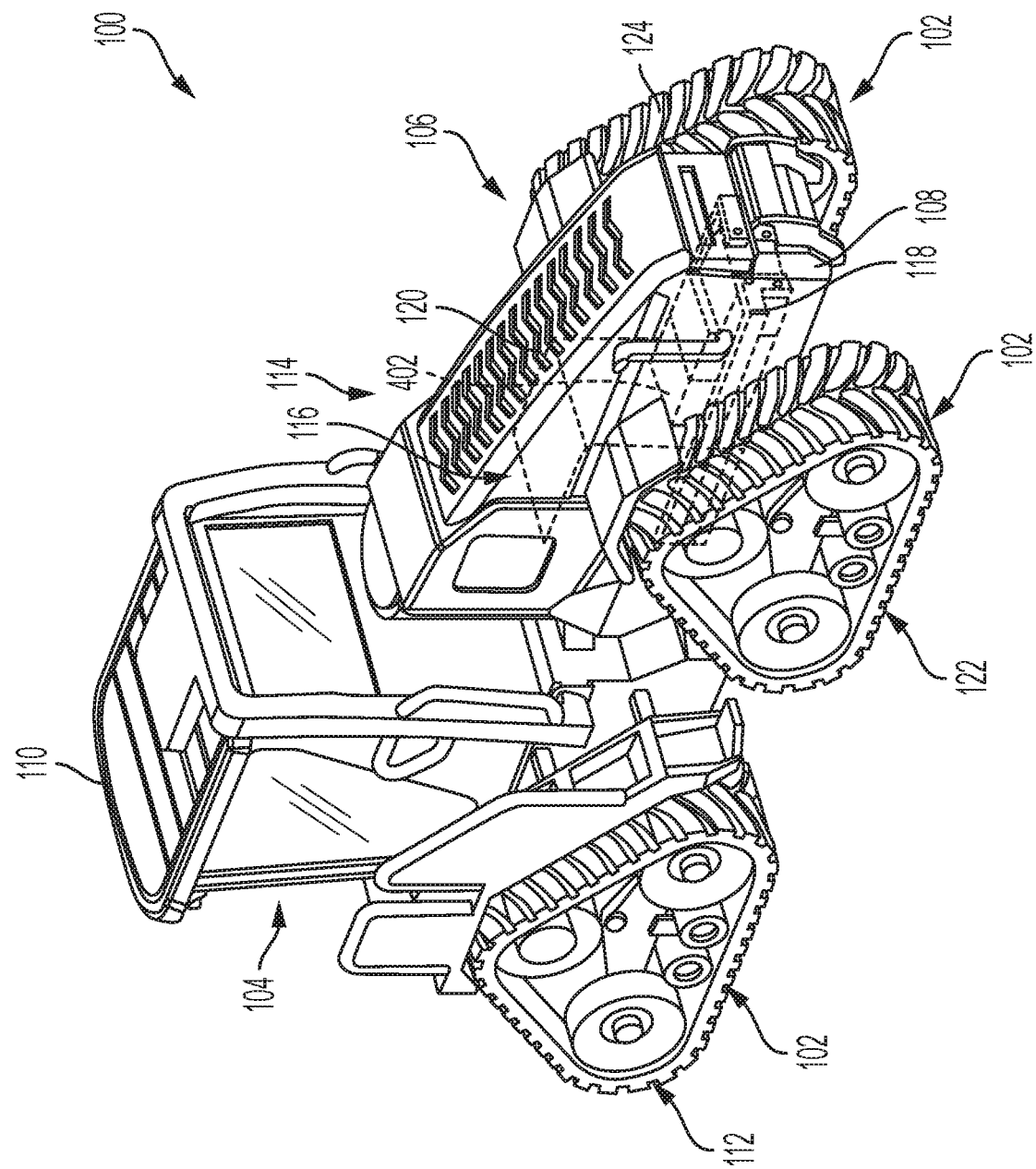
FIG. 1 is an elevated perspective view of a work machine having tracks.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, a tracked vehicle or work machine 100 having a plurality of track assemblies 102 is illustrated. In the embodiment of FIG. 1, four track assemblies 102 are illustrated. However, this disclosure also considers embodiments having only one or two track assemblies 102. Further still, other embodiments may have more than four track assemblies 102. Accordingly, FIG. 1 illustrates four track assemblies for exemplary purposes, but this disclosure also considers applying the teachings described herein to work machines having more or less track assemblies 102 as well.

The work machine 100 of FIG. 1 may have a front section 104 and a rear section 106 that are pivotally coupled to one another to articulate. Each of the front and rear sections 104, 106 may have a frame or chassis 108 that allows components of the work machine 100 to be coupled thereto. More specifically, the front section 104 may have an operators cab 110 coupled thereto. Further, the front section 104 may have a first and second front track assembly 112, 114 coupled to the front chassis 108.

The rear section 106 may have a prime mover 116 coupled to the chassis 108. The rear section 106 may have a first and second rear track assembly 122, 124 coupled thereto. The prime mover 116 may selectively provide torque to the plurality of track assemblies 102 via a transmission 118 among other things. The transmission 118 may be a series of clutches, gears, and the like that selectively transfers torque generated by the prime mover 116 to the plurality of track assemblies 102 as is known in the art. The prime mover 116 may be a gas or diesel engine that provides torque to an input of the transmission 118.

While the prime mover 116 is illustrated coupled to the chassis 108 at the rear section 106, in other embodiments the prime mover 116 may be coupled to the front section 104. Accordingly, this disclosure considers coupling the prime mover 116 to the front or rear sections 104, 106.

In one aspect of this disclosure, the prime mover 116 may also be coupled to one or more generator 120 to provide electrical power to the work machine 100. More specifically, at least part of the torque generated by the prime mover 116 may be directed to the generator 120 to rotate the generator 120 to thereby generate electrical energy. The electrical energy created by the generator 120 may then be stored in a battery or the like or consumed by the electrical systems of the work machine 100.

Figure 2:
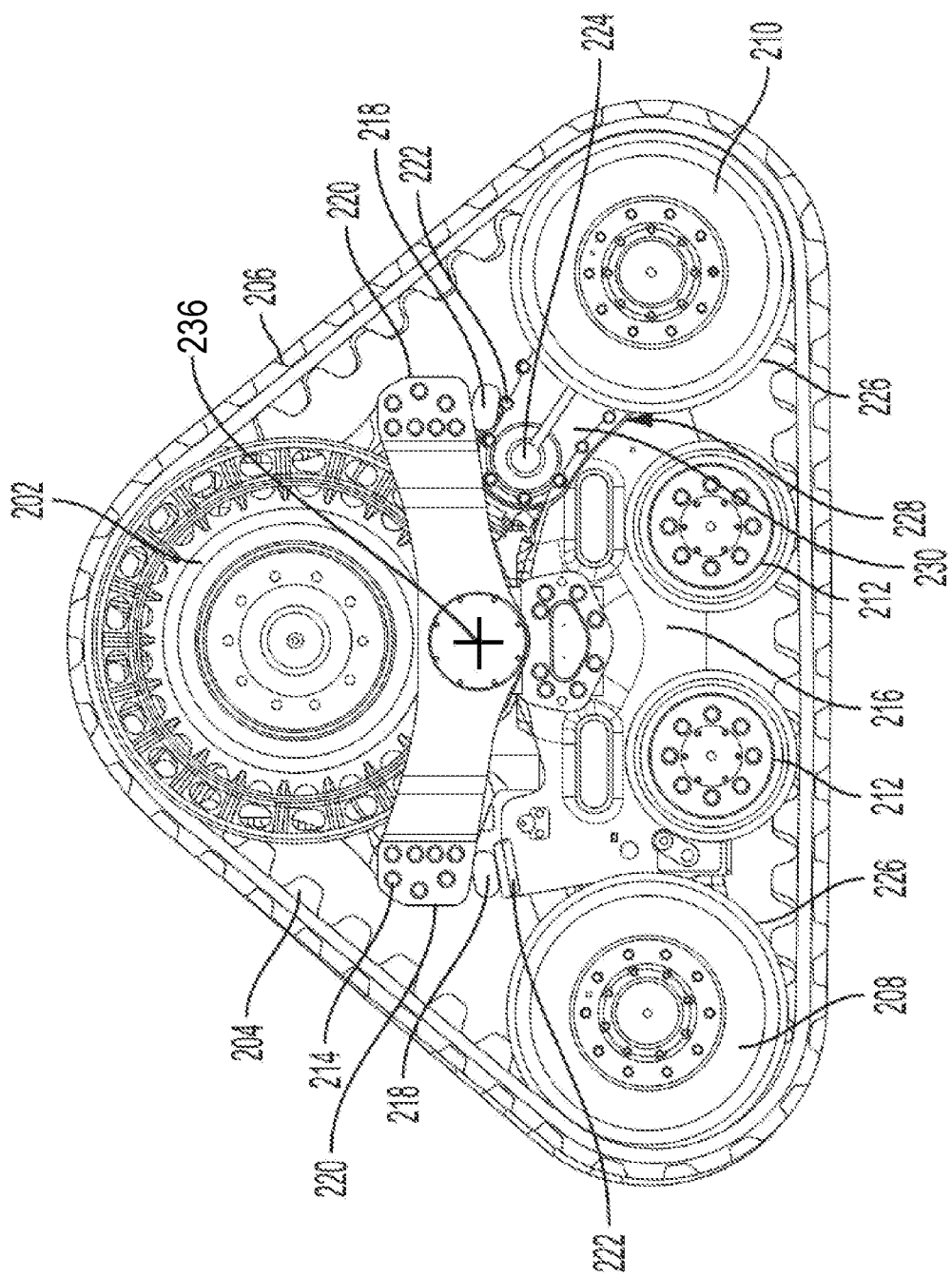
FIG. 2 is a side view of a track assembly.

Referring now to FIG. 2, a side view of one of the plurality of track assemblies 102 is illustrated. The track assembly 102 may have a final drive sprocket 202 that is selectively coupled to the prime mover 116 via the transmission 118 as described above. The final drive sprocket 202 may have a plurality of cavities spaced radially about the final drive sprocket 202 and sized to correspond with teeth 204 that project inwardly from a track 206. The final drive sprocket 202 may be powered by the prime mover 116 through the transmission 118 to provide a torque to the final drive 202 to thereby move the track 206 around the track assembly 102.

While the final drive sprocket 202 is shown and described herein as a sprocket that engages the teeth 204 of the track 206, in other embodiments the final drive sprocket 202 may not be a sprocket at all. More specifically, the final drive sprocket 202 may be a final drive wheel that frictionally engages an inner side of the track 206 instead of engaging the teeth 204. Accordingly, this disclosure considers using any track engagement method known in the art for transferring torque from the final drive sprocket 202 to the track 206.

The track 206 may also travel around a first and second idler wheel set 208, 210. The idler wheel sets 208, 210 may be positioned at a leading edge and trailing edge respectively of the track assembly 102. Accordingly, in one aspect of this disclosure, the final drive sprocket 202, first idler wheel set 208, and second idler wheel set 210 define rounded corners of a triangular perimeter along which the track 206 moves. Further still, one or more roller 212 may be positioned between the first and second idler wheel set 208, 210 to promote the easy movement of the track 206 about the track assembly 102. Each of the first and second idler wheel sets 208, 210 may actually be comprised of an outer and an inner idler wheel as is described in more detail with reference to FIG. 6.

The track assembly 102 may have an undercarriage frame 214 coupled to the chassis 108 of the work machine 100. The undercarriage frame 214 may by rigidly mounted to the chassis 108 with fasteners, welds, or the like or have a suspension component positioned between the undercarriage frame 214 and the chassis 108. Regardless of the mounting configuration, the undercarriage frame 214 may couple the track assembly 102 to the chassis 108.

A rocker arm 216 may be pivotally coupled to the undercarriage frame 214 about a rocker arm pivot 236. The rocker arm 216 may pivot relative to the undercarriage frame 214 to undulate along the underlying surface as the work machine 100 moves thereon. Further, a suspension component 218 may be positioned to springedly resist rotation of the rocker arm 216 relative to the undercarriage frame 214. More specifically, each suspension component 218 may be positioned between an undercarriage mount 220 and a rocker arm mount 222 to dampen or otherwise resist pivotal movement of the rocker arm 216 relative to the undercarriage frame 214.

In one aspect of this disclosure, one or more of the idler wheel sets 208, 210 may each be powered by an electric drive system 228. The electric drive system 228 may have an electric motor 224 coupled to a motor housing 230. The electric motor 224 may be mechanically coupleable to the idler wheel set 210 to provide auxiliary torque to the track 206. The electric motor 224 may be mechanically coupled to the idler wheel set 210 to selectively provide torque to the idler wheel set 210 when the electric motor 224 is powered. In this configuration, the electric motor 224 may be powered by the work machine 100 when the work machine 100 is directed to provide torque to the track assembly 102 through the transmission 118. In other words, when the user desires to move the work machine 100 along the underlying surface, the final drive sprocket 202 may provide torque to the track 206 through the transmission 118 and the prime mover 116 while the idler wheel set 210 provides torque to the track 206 from the electric motor or motors 224.

While FIG. 2, illustrates only the second idler wheel set 210 having an electric drive system 228 coupled thereto, this disclosure also considers implementing the teachings described herein for the first idler wheel set 208 as well. Further still, in one contemplated embodiment only the first idler wheel set 208 may be coupled to an electric drive system. Accordingly, this disclosure considers any combination of idler wheels mechanically coupled to electric motors.

In one aspect of this disclosure, the electric motor may be selectively provided electricity obtained from the generator 120. The work machine 100 may have a power management system that allows the electricity generated by the prime mover 116 through the generator 120 to be selectively directed to the electric motor 224. Further, one or more battery may also be selectively coupled to the electric motor 224 to provide power thereto. Regardless of the source, the work machine 100 may selectively provide auxiliary power to the track assembly 102 by powering the electric motor 224 that is mechanically coupled to the idler wheel set 210.

In one aspect of this disclosure, the idler wheel sets 208, 210 may have a frictional interface 226 positioned between the idler wheel set 208, 210 and the track 206. More specifically, the frictional interface 226 may be positioned along the radially outermost surface of the idler wheel set 208, 210 and formed of a material that promotes frictional engagement between the idler wheel set 208, 210 and the track 206. Further, the frictional interface 226 may also dampen contact between the idler wheel set 208, 210 and the track 206 to reduce noise and vibrational inputs experienced by the work machine 100. Further still, the frictional interface 226 may have a pattern defined in the radially outer surface to further facilitate transferring torque applied to the idler wheel set 210 to the track 206 along the frictional interface 226.

Figure 3:
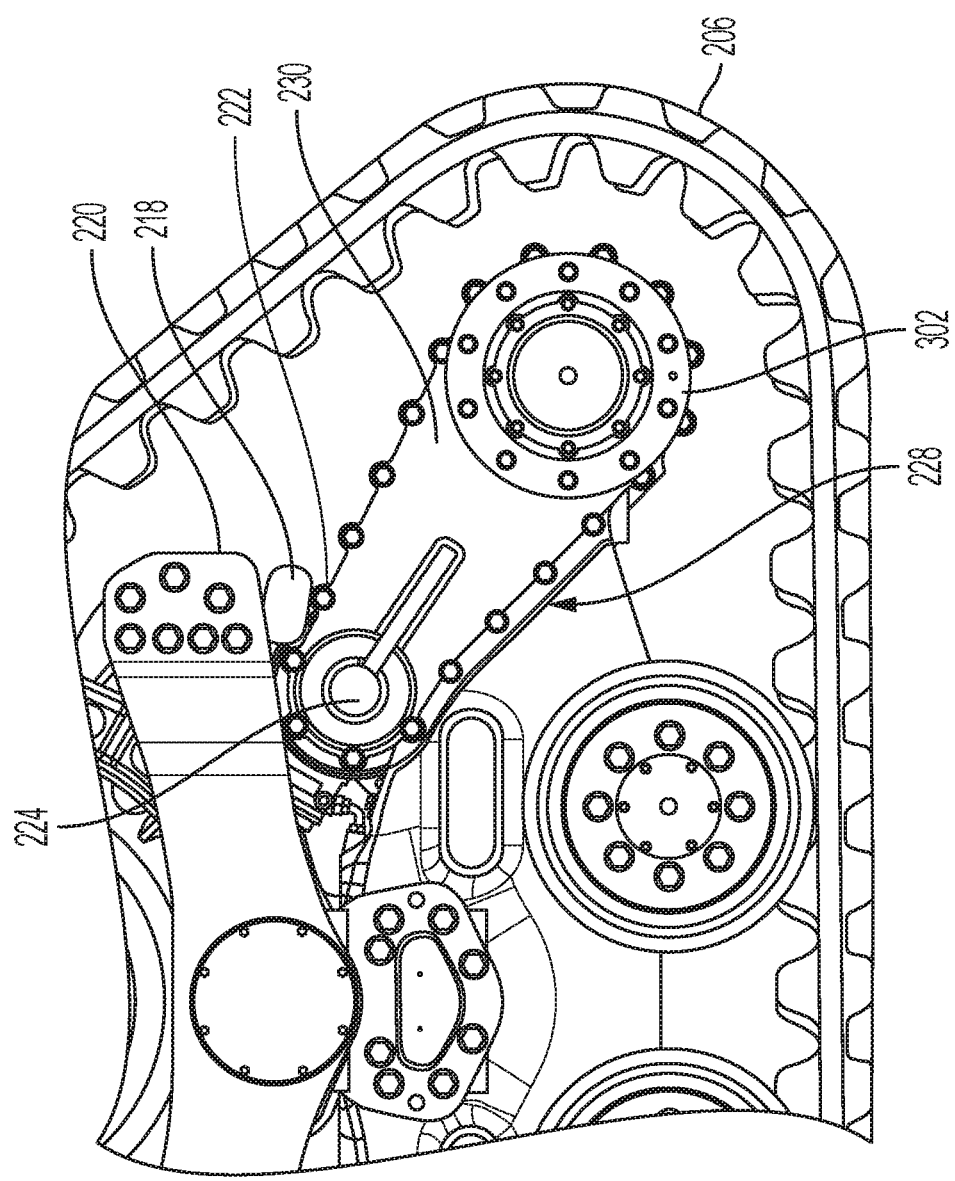
FIG. 3 is a side view of a partial section of the track assembly of FIG. 2 with idler wheels removed.

Referring now to FIG. 3, the track assembly 102 is illustrated with the second idler wheel set 210 removed. More specifically, an outer idler wheel hub 302 is illustrated in FIG. 3. While only the outer idler wheel hub 302 is illustrated in FIG. 3, an inner idler wheel hub 622 (see FIG. 6) may also be positioned on the track assembly 102. The idler wheel hub 302 may provide a location to selectively couple one wheel of the second idler wheel set 210 to the track assembly 102. Further, the idler wheel hub 302 may be mechanically coupled to the electric motor 224 as part of the electric drive system 228. Accordingly, when the second idler wheel set 210 is coupled to the idler wheel hub 302 the torque generated by the electric motor 224 may be transferred to the second idler wheel set 210 through the idler wheel hub 302. In turn, the second idler wheel set 210 may provide a track moving force to the track 206 through the frictional interface 226.

The idler wheel set 210 may be removably coupled to the idler wheel hubs 302, 622 with one or more removable fastener such as lug bolts and studs or the like. In one aspect of this disclosure, the idler wheel set 210 may be removable from the idler wheel hubs 302, 622 to facilitate the installation and maintenance of the track 206. More specifically, the idler wheel set 210 may be removed from the idler wheel hubs 302, 622 to allow the track 206 to be positioned around, or removed from, the track assembly 102.

Figure 4:
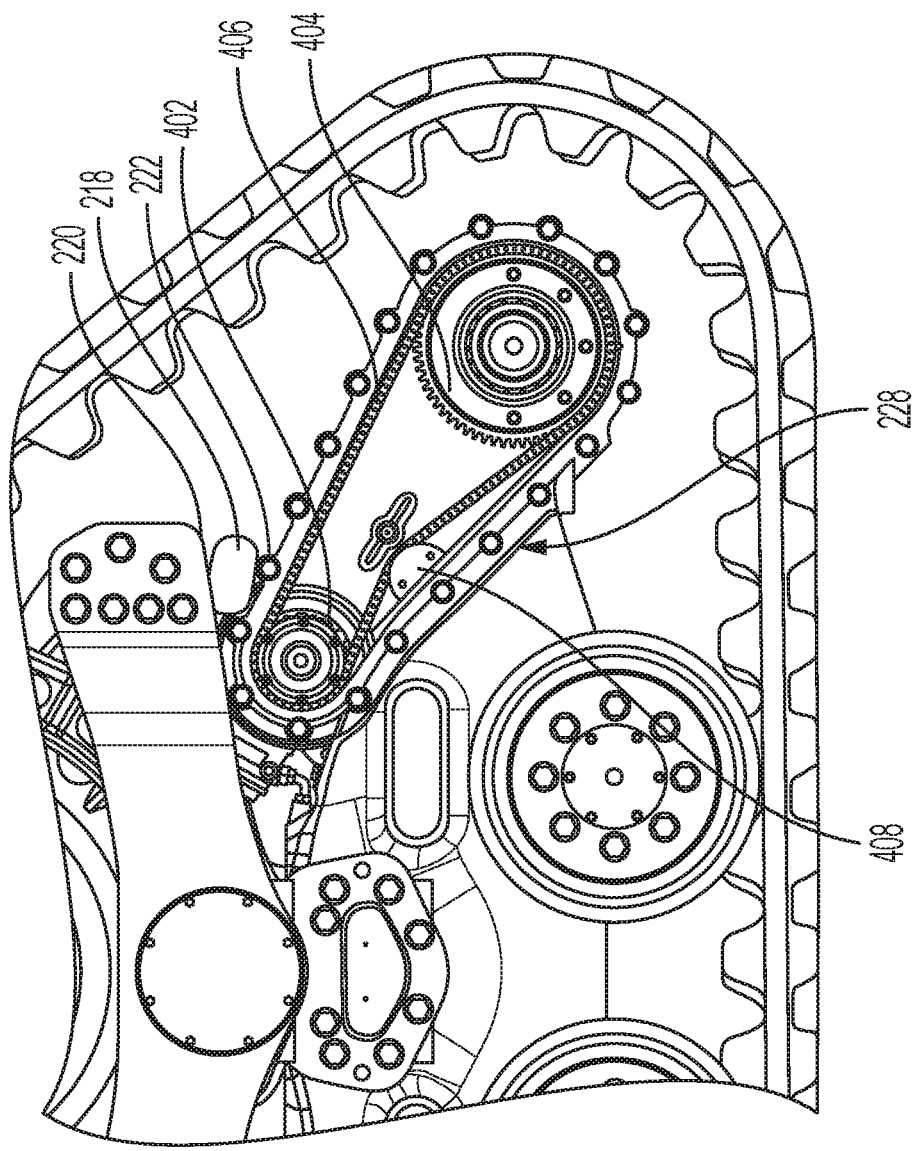
FIG. 4 is a side view of a partial section of the track assembly of FIG. 2 with several components of the track assembly removed.

Referring now to FIG. 4, the electric drive system 228 is illustrated with a portion of the motor housing 230 and idler wheel hub 302 removed. FIG. 4 illustrates a motor sprocket 402 rotationally coupled to an idler sprocket 404 with a chain 406. In this configuration, the torque produced by the electric motor 224 may be transferred to the idler wheel hub 302 through the sprockets 402, 404 and chain 406 arrangement. In the non-exclusive example illustrated in FIG. 4, the idler sprocket 404 may be coupled to the idler wheel hubs 302, 622 to allow the idler wheel hubs 302, 622 to rotate with the idler sprocket 404. Further, the chain 406 may be directed over a tensioner 408 that applies a force to the chain 406 to thereby ensure that the chain 406 remains in tension between the sprockets 402, 404.

Figure 5:
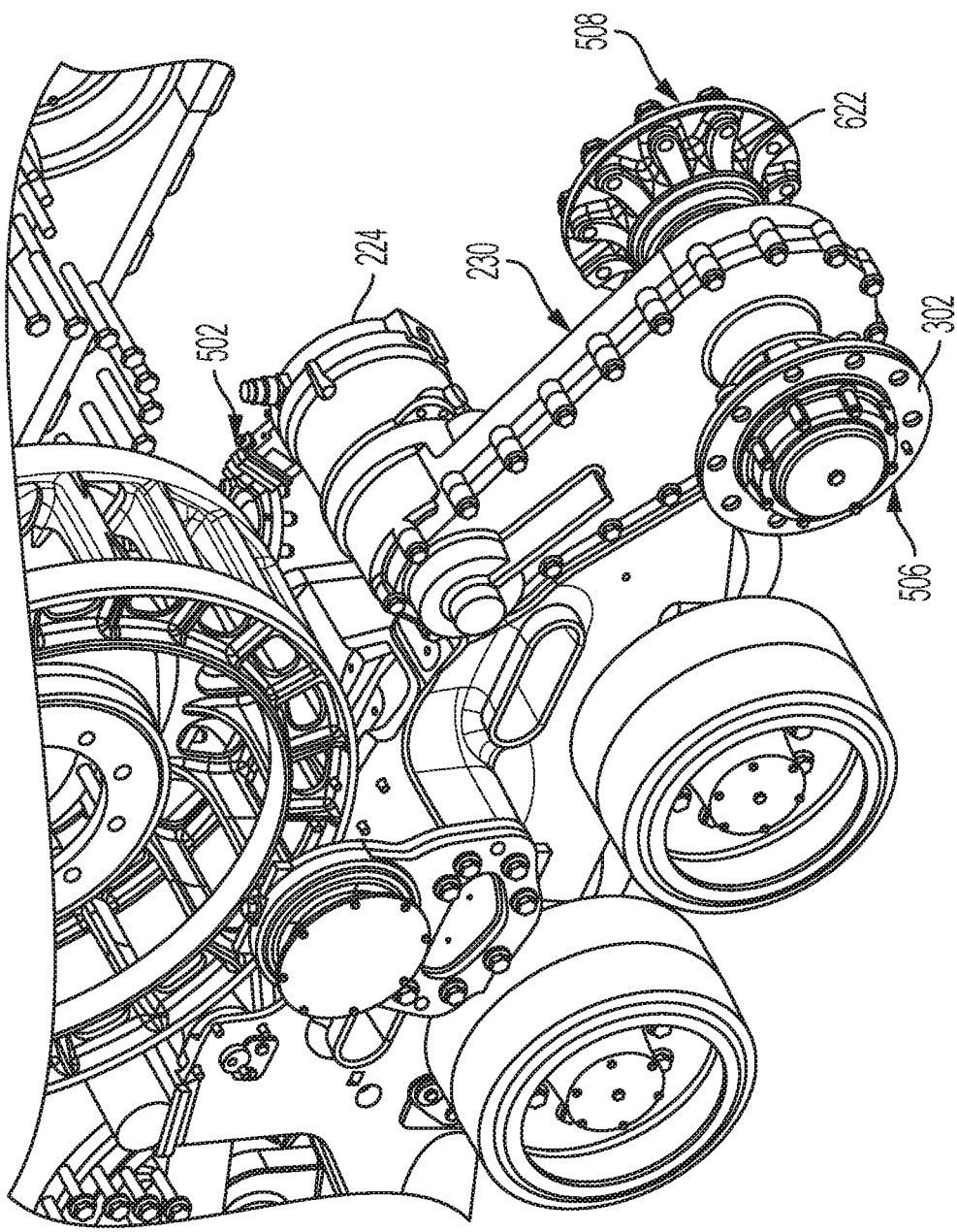
FIG. 5 is an elevated perspective view of the track assembly of FIG. 2 with a track and idler wheels removed.

FIG. 5 illustrates an elevated perspective view of the track assembly 102 with the idler wheel set 210 and the track 206 removed therefrom among other things. More specifically, the idler wheel hubs 302, 622 are illustrated as having a first side 506 and a second side 508 that removably couple the second idler wheel set 210 thereto. In other words, the idler wheel set 210 may have an outer idler wheel 616 and an inner idler wheel 618 coupled to the idler wheel hubs 302, 622. The outer idler wheel 616 may be coupled to the outer wheel hub 302 on the first side 506 and the inner idler wheel 618 may be coupled to the inner wheel hub 622 at the second side 508. In one aspect of this disclosure, the idler wheel hubs 302, 622 may space the idler wheel set 210 from one another a sufficient distance to allow the teeth 204 of the track 206 to pass there between without substantially contacting the idler wheel set 210.

In another aspect of this disclosure, the motor housing 230 may define an electrical coupler 502. The electrical coupler 502 may be a location to couple the electric motor 224 to a power source such as the generator 120 or a battery. Further, a controller may selectively provide power to the electric motor 224 through the electrical coupler 502 based on a control algorithm or the like. The electrical coupler 502 may be configured to correspond with a wire harness so the electrical motor 502 may be easily uncoupled from the wire harness. Further still, the electrical coupler 502 may couple any sensors of the electric motor 224 to the controller to identify the working conditions of the electric drive system 228 such as motor speed or energy consumption.

Figure 6:
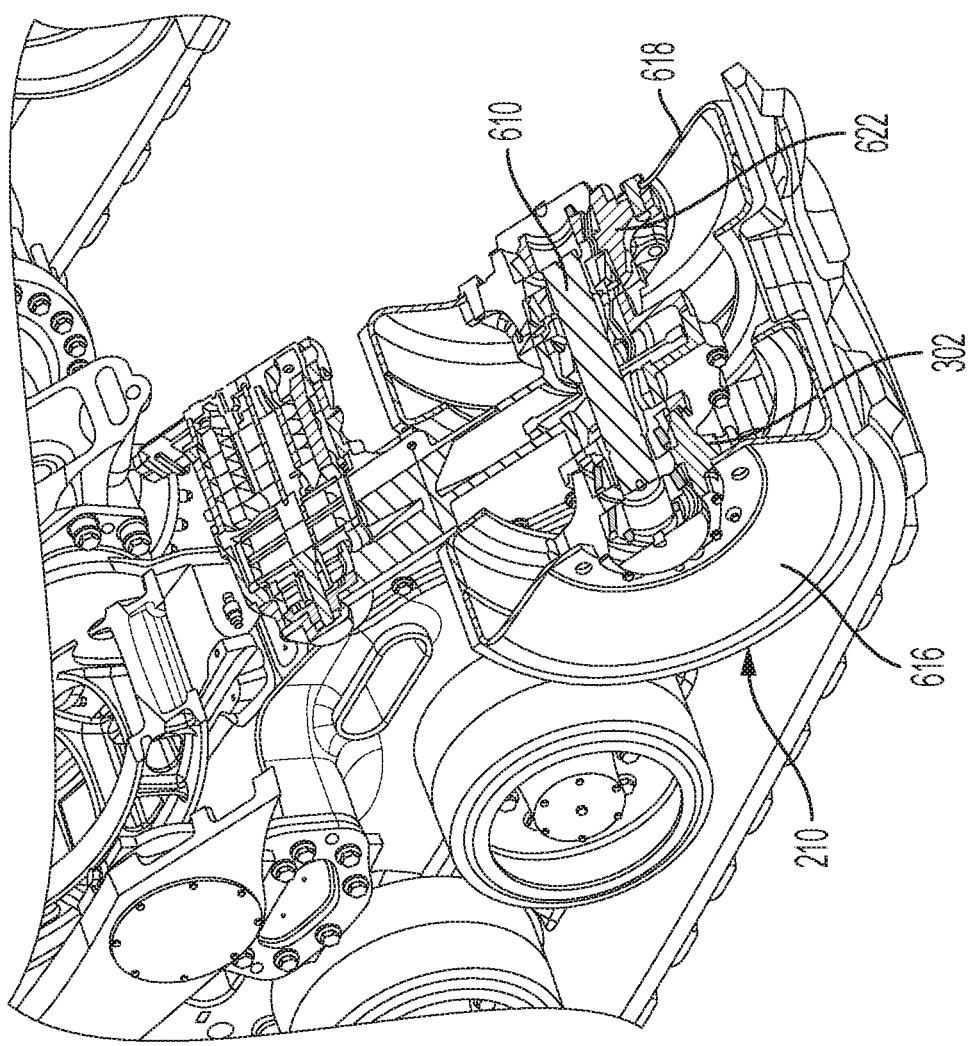
FIG. 6 is an elevated perspective view of a section of the track assembly of FIG. 2.
Figure 7:
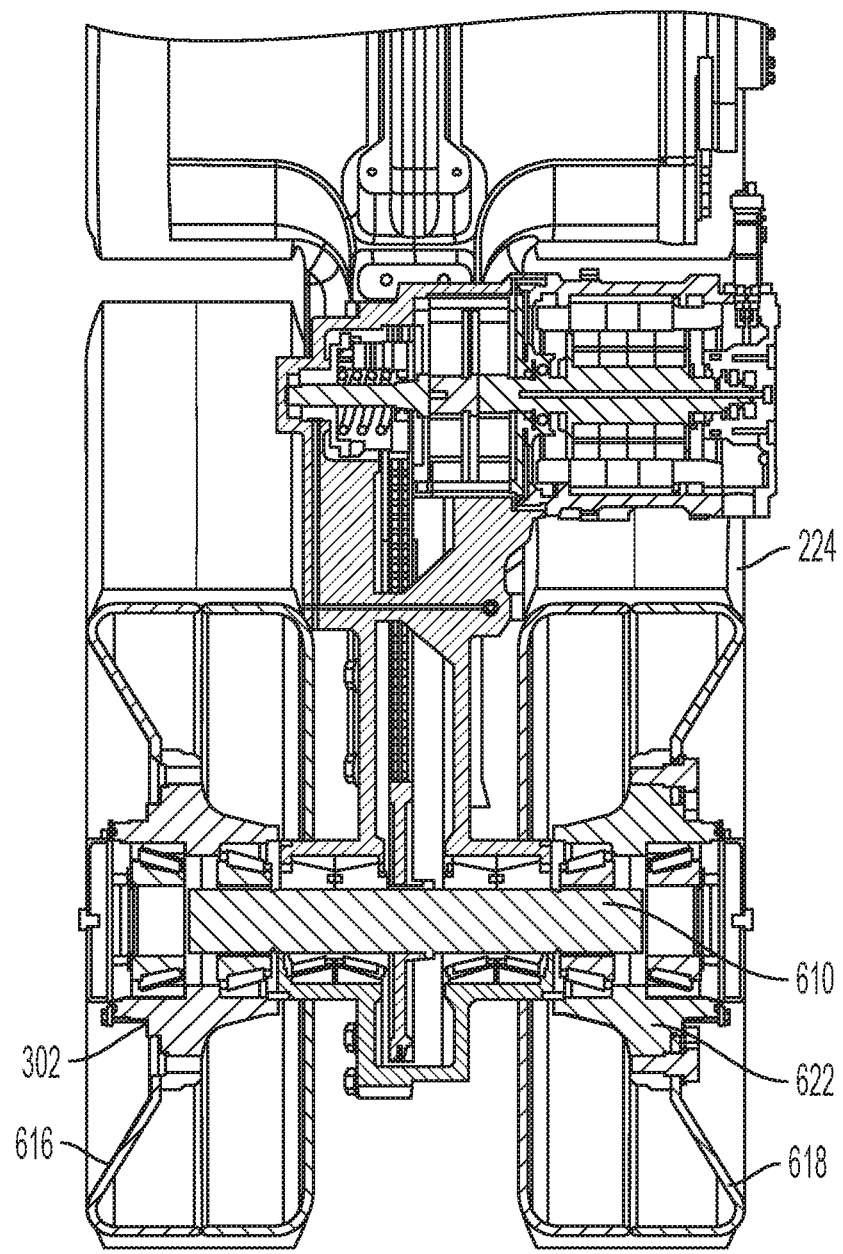
FIG. 7 is a rear section view of the track assembly of FIG. 2.
Figure 8:
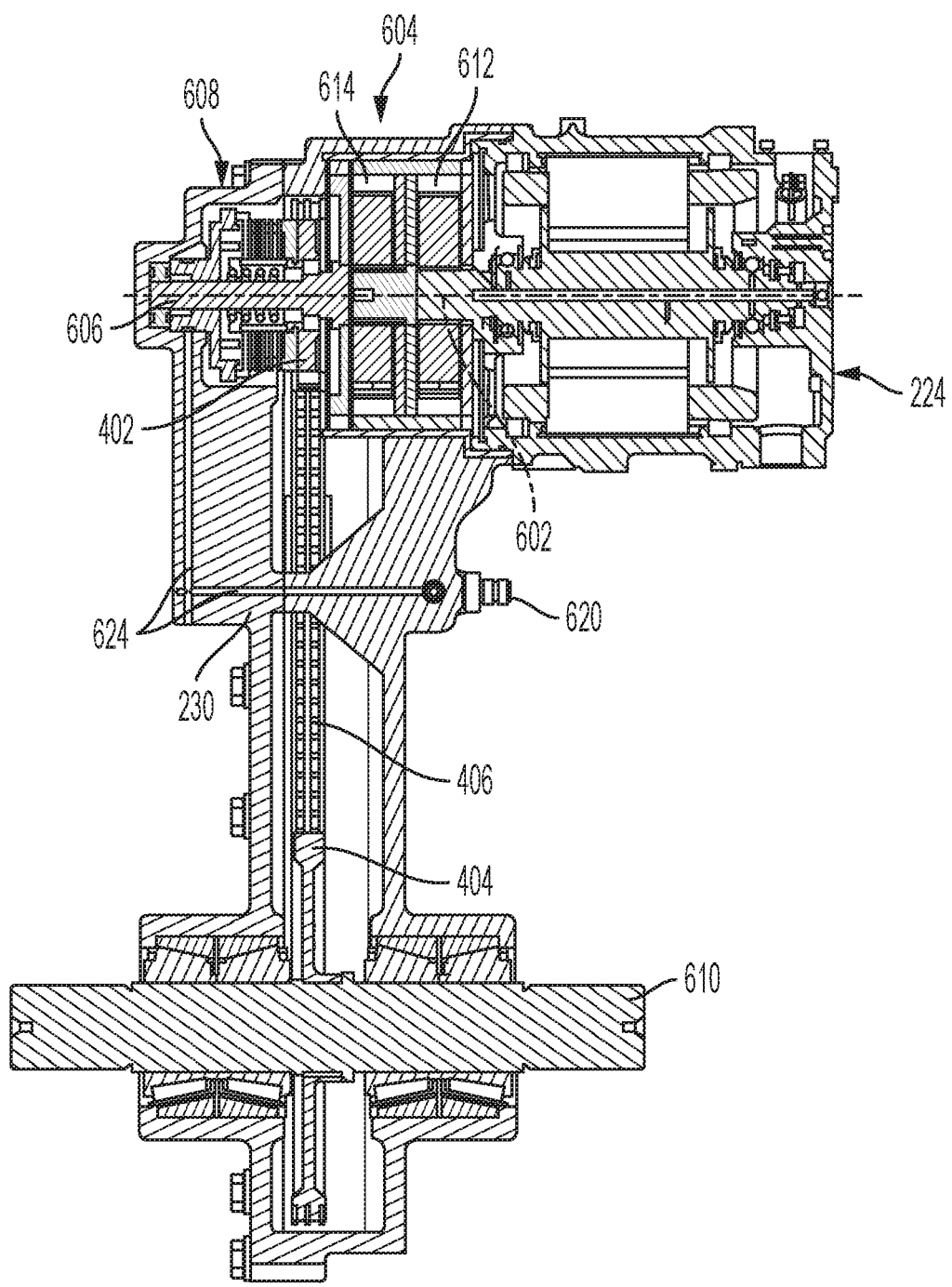
FIG. 8 is a schematic view of an electric drive system of the track assembly of FIG. 2.

Referring now to FIGS. 6-8, a half-section view of the electric drive system 228 is illustrated. More specifically, the electric motor 224 is illustrated having an output shaft 602 that provides torque from the electric motor 224 to a geared reduction 604. The geared reduction 604 may have a reduction output 606 that is coupled to a clutch assembly 608. The clutch assembly 608 may be part of an electrohydraulic system that selectively engages the clutch assembly 608 to transfer torque generated by the electric motor 224 to the motor sprocket 402. Further, the chain or belt 406 rotationally couples the motor sprocket 402 to the idler sprocket 404 to transfer torque generated by the electric motor 224 to an idler wheel shaft 610 when the clutch assembly 608 is engaged.

In one aspect of this disclosure, the clutch assembly 608 may have an engaged state and a disengaged state. In the engaged state, the clutch assembly 608 may transfer torque generated by the electric motor 224 to the motor sprocket 402 as described above. In the disengaged state, the clutch assembly 608 may not transfer torque generated by the electric motor 224 to the motor sprocket 402. Accordingly, in the disengaged state, the second idler wheel set 210 is not rotationally coupled to the electric motor 224.

The geared reduction 604 may provide a speed reduction between the output shaft 602 and the reduction output shaft 606 and further increase the torque output to the reduction output shaft 606. More specifically, in one embodiment of the present disclosure the geared reduction 604 comprises a first planetary gear set 612 and a second planetary gear set 614. The first planetary gear set 612 may have a first sun gear coupled to the output shaft 602 of the electric motor 224. A plurality of first planetary gears may be positioned between the first sun gear and a first ring gear. A first planetary carrier may be coupled to each of the plurality of first planetary gears and further coupled to a first planetary output.

The second planetary gear set 614 may have a second sun gear that is coupled to the first planetary carrier. Further, the second planetary gear set 614 may have a second plurality of planetary gears coupled between the second sun gear and a second ring gear. Further still, the second planetary gear set 614 may have a second planetary carrier that is coupled to each of the plurality of second planetary gears. The second planetary carrier may further be coupled to the reduction output 606 to provide an output speed from the geared reduction that is less than the input speed from the output shaft 602. Further, the torque provided to the reduction output 606 may be greater than the torque input into the geared reduction 604.

While a specific configuration for the geared reduction 604 is explained above, this disclosure is not limited to such a configuration but rather considers any type of mechanical device that can alter an output speed and torque relative to an input speed and torque. Further still, in other embodiments the output shaft 602 of the electric motor 224 may be coupled directly to the motor sprocket 402 and there by no geared reduction 604 at all. Accordingly, this disclosure considers implementing any known geared reduction 604 or no geared reduction at all between the output shaft 602 of the motor and the motor sprocket 402.

As described above, the second idler wheel set 210 may include an outer idler wheel 616 and an inner idler wheel 618. The outer idler wheel 616 may be coupled to the idler wheel shaft 610 through an outer idler wheel hub 302 and the inner idler wheel 618 may be coupled to the idler wheel shaft 610 through an inner idler wheel hub 622. Accordingly, both the outer idler wheel 302 and the inner idler wheel 618 are rotationally coupled to the idler wheel shaft 610 to rotate there with as torque is applied to the idler wheel shaft 610 with the idler sprocket 404.

A fluid coupler 620 may be defined by the motor housing 230. The fluid coupler 620 may be fluidly coupled to a hydraulic, pneumatic, grease, or the like system to provide a fluid to the components of the electric drive system 228. In one non-exclusive example, the fluid coupler 620 may selectively provide hydraulic fluid to the clutch assembly 608 positioned within the electric drive system 228. The hydraulic fluid may be provided through the fluid coupler 620 and a plurality of fluid passageways 624 defined in the motor housing 230 to selectively engage the clutch assembly 608 as part of an electro hydraulic system of the work machine 100. The clutch assembly 608 may selectively mechanically couple an output of the electrical motor 224 to the idler sprocket 404 as described above based on the fluid pressure provided to the clutch assembly 608 through the fluid coupler 620 and the fluid passageways 624.

Figure 9:
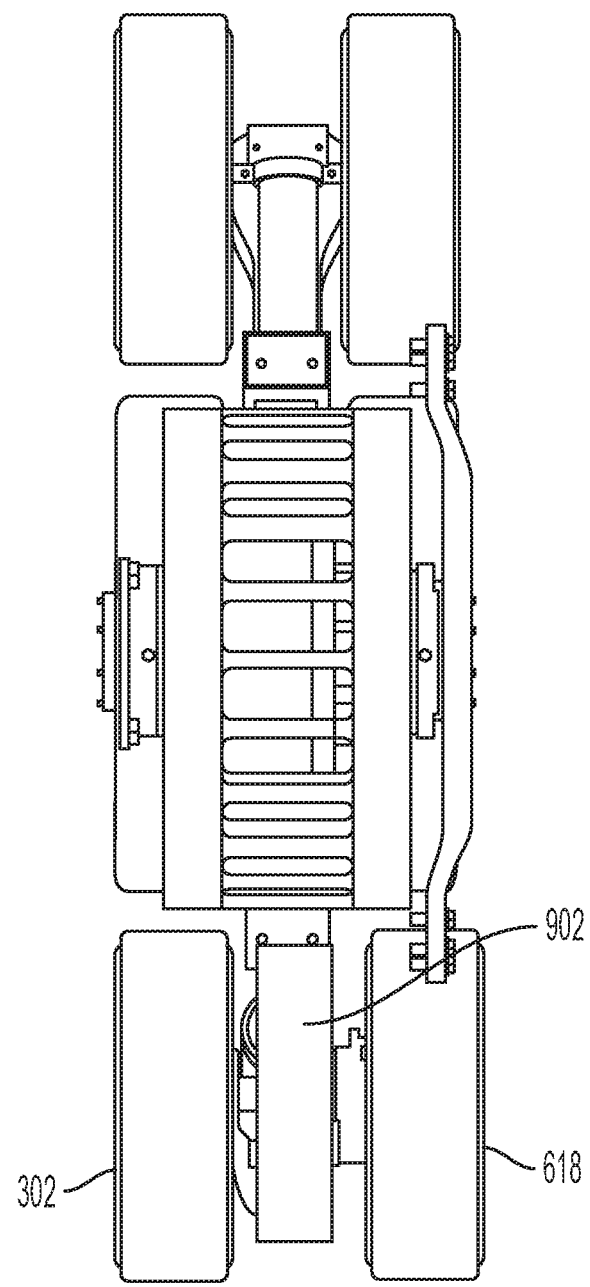
FIG. 9 is another embodiment of the electric drive system wherein a motor is positioned between idler wheels.

Referring now to FIG. 9, yet another embodiment of the present disclosure is illustrated. In FIG. 9, a motor 902 may be positioned directly around the idler wheel shaft 610 to provide torque thereto. In this configuration, the sprockets and chain or belt described above may be omitted, and the motor 902 may be positioned directly around the idler wheel shaft 610. In this embodiment, the motor 902 may have a diameter that is greater than its thickness, such as a pancake motor or the like, and be positionable between the outer and inner idler wheel 302, 618. Further, the motor 920 may fit in the space between outer and inner idler wheel 302, 618.

Figure 10:
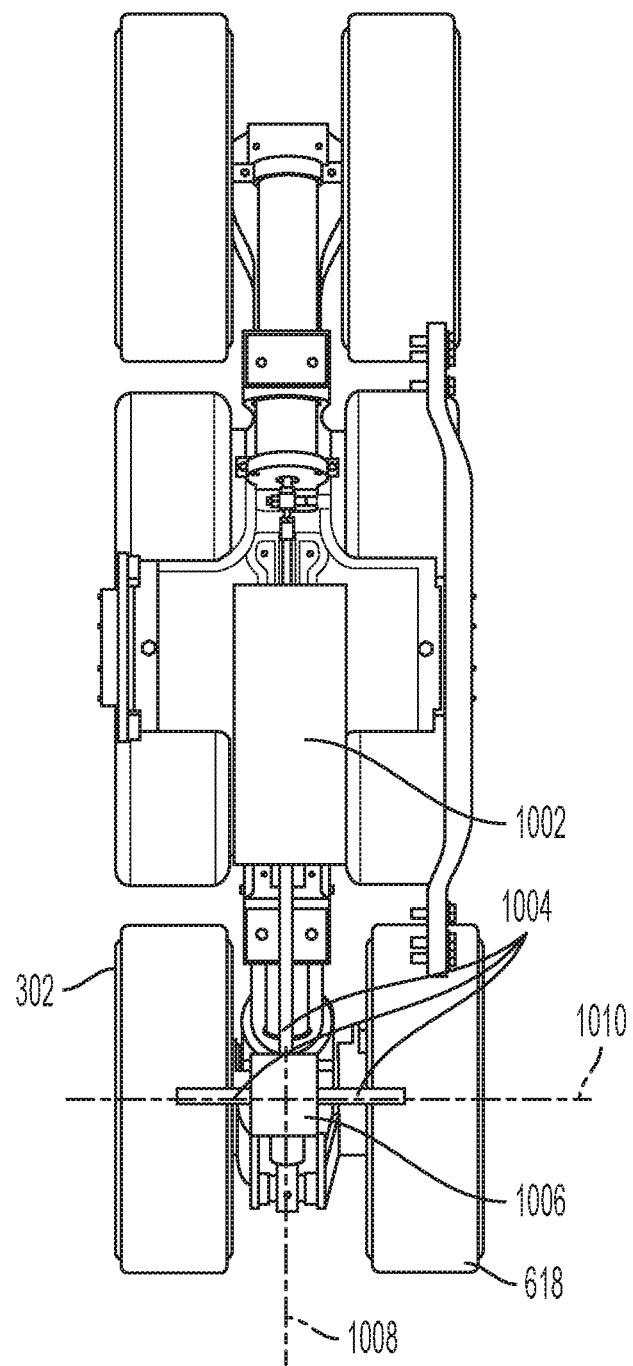
FIG. 10 is another embodiment of the electric drive system wherein shafts distribute torque to idler wheels.

Referring now to FIG. 10, another embodiment of the present disclosure is illustrated. In FIG. 10, a motor 1002 may be positioned along a central portion of the rocker arm 216 and be coupled to the inner and outer idler wheels 302, 618 with one or more shafts 1004. Further, the motor 1002 may have an output shaft 1004 that rotates along a longitudinal axis 1008 while the wheels 302, 618 rotate about a wheel axis 1010 that is substantially perpendicular to the longitudinal axis. To accommodate this transition of axial rotation, the shafts 1004 may be coupled to one or more right angle drive assembly 1006 to thereby direct torque produced by the motor 1002 to rotate about the wheel axis 1010 from the longitudinal axis 1008.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An undercarriage assembly for a tracked vehicle, comprising:
    a prime mover that provides a torque to the tracked vehicle;
    a final drive sprocket configured to provide a final drive torque on a track;
    a transmission mechanically coupled to the prime mover and the final drive sprocket to selectively transfer at least some of the torque generated by the prime mover to the final drive sprocket;
    an undercarriage frame coupled to the tracked vehicle;
    a rocker arm pivotally coupled to the undercarriage frame about a pivot, the rocker arm configured to pivot about the pivot relative to the undercarriage frame;
    at least one idler wheel rotationally coupled to the rocker arm and that contacts the track; and
    an electric drive system that includes an electric motor and a motor housing, where the electric motor provides an idler torque to the at least one idler wheel;

wherein, torque is distributed to the track through both the final drive sprocket and the idler wheel;
wherein the electric drive system is coupled to the rocker arm and is configured to pivot about the pivot relative to the undercarriage frame; and the motor housing defines a suspension mount between the motor housing and the undercarriage frame.

2. The undercarriage assembly of claim 1, further wherein the electric motor is coupled to a motor sprocket and the idler wheel is coupled to an idler sprocket.

3. The undercarriage assembly of claim 2, further comprising a chain or belt rotationally coupling the motor sprocket to the idler sprocket.

4. The undercarriage assembly of claim 2, further comprising a geared reduction between the motor and the motor sprocket.

5. The undercarriage assembly of claim 4, further wherein the geared reduction has a first reduction planetary drive and a second reduction planetary drive.

6. The undercarriage assembly of claim 2, further comprising a clutch coupled to the motor sprocket, wherein the clutch selectively releases the rotational coupling between a motor output and the motor sprocket.

7. The undercarriage assembly of claim 6, further wherein the clutch is selectively disengaged by an electro-hydraulic system.

8. A track assembly for a work machine, comprising:
an undercarriage frame coupled to the work machine;
a final drive rotationally coupled to the work machine;
a transmission mechanically coupled to the final drive and a prime mover, the transmission selectively providing torque to the final drive;
a rocker arm pivotally coupled to the work machine about a pivot, the rocker arm configured to pivot about the pivot relative to the undercarriage frame;
an idler wheel rotationally coupled to the rocker arm; and
an electric drive system coupled to the idler wheel to selectively provide torque to the idler wheel;
wherein, torque is provided to a track of the track assembly through both the final drive and the idler wheel;
wherein the electric drive system is coupled to the rocker arm and is configured to pivot about the pivot relative to the undercarriage frame; and
wherein the electric drive system comprises a motor housing that defines a suspension mount between the motor housing and the undercarriage frame.

9. The track assembly of claim 8, further wherein the electric drive system comprises:
an electric motor mounted to the rocker arm;
a motor sprocket coupled to a motor output assembly;
an idler sprocket coupled to the idler wheel; and
a chain or belt rotationally coupling the motor sprocket to the idler sprocket.

10. The track assembly of claim 9, further comprising a geared reduction between the motor and the motor sprocket.

11. The track assembly of claim 9, further wherein the electric drive system includes a clutch coupled to the motor sprocket, wherein the clutch selectively releases the rotational coupling between the motor output assembly and the motor sprocket.

12. The undercarriage assembly of claim 2, wherein the idler wheel includes an inner idler wheel and an outer idler wheel spaced from the inner idler wheel, and further wherein the idler sprocket is located between the inner idler wheel and the outer idler wheel.

13. The track assembly of claim 8, further wherein the electric drive system includes an electric motor coupled to a right angle drive assembly via shafts, wherein the right angle drive assembly provides torque to the idler wheel.

14. A track assembly for a work machine, comprising:
an undercarriage frame coupled to the work machine;
a final drive rotationally coupled to the work machine;
a transmission mechanically coupled to the final drive and a prime mover, the transmission selectively providing torque to the final drive;
a rocker arm pivotally coupled to the undercarriage frame about a pivot, the rocker arm configured to pivot about the pivot relative to the undercarriage frame;
an idler wheel rotationally coupled to the rocker arm, wherein the idler wheel includes an inner idler wheel and an outer idler wheel spaced from the inner idler wheel; and
an electric drive system coupled to the idler wheel to selectively provide torque to the idler wheel, wherein the electric drive system comprises a motor positioned at least partially between the inner idler wheel and the outer idler wheel;
wherein, torque is provided to a track of the track assembly through both the final drive and the idler wheel.

15. The track assembly of claim 14, further wherein the motor of the electric drive system has a diameter that is greater than a thickness of the motor and the motor selectively drives the idler wheel by providing torque to an idler wheel shaft.

16. The track assembly of claim 14, wherein the electric drive system includes an electric motor coupled to a right angle drive assembly via shafts, wherein the right angle drive assembly provides torque to the idler wheel.

17. A torque delivery system for a work machine, comprising:
a prime mover that generates torque;
a plurality of track assemblies;
a transmission mechanically coupling the prime mover to each of the plurality of track assemblies to provide torque thereto;
a generator mechanically coupled to the prime mover to convert torque from the prime mover into electrical energy; and
an electric drive system mounted on at least one of the plurality of track assemblies;
an undercarriage frame coupled to the work machine;
wherein the at least one of the plurality of track assemblies includes a rocker arm pivotally coupled to the undercarriage frame about a pivot and the electric drive system is coupled to the rocker arm, where the rocker arm and the electric drive system are configured to pivot about the pivot relative to the undercarriage frame;
wherein the electric drive system comprises a motor housing, and the motor housing defines a suspension mount between the motor housing and the undercarriage frame;
wherein, both the electric drive system and the transmission provide torque to at least one of the plurality of track assemblies.

18. The torque delivery system of claim 17, further wherein the plurality of track assemblies include four separate track assemblies wherein at least two of the track assemblies have an electric drive system.

19. The torque delivery system of claim 18, further wherein each of the four separate track assemblies have an electric drive system.

20. The torque delivery system of claim 19, further wherein the electric drive system comprises:

an electric motor mounted to the rocker arm;
a motor sprocket coupled to a motor output assembly;
an idler sprocket coupled to the idler wheel; and
a chain or belt rotationally coupling the motor sprocket to the idler sprocket.

\* \* \* \* \*